No. 610,786. Patented Sept. 13, 1898.
J. W. ALLEN & C. WEST.
CHECK ROW PLANTER.
(Application filed July 23, 1897.)

(No Model.) 2 Sheets—Sheet 1.

No. 610,786. Patented Sept. 13, 1898.
J. W. ALLEN & C. WEST.
CHECK ROW PLANTER.
(Application filed July 23, 1897.)
(No Model.) 2 Sheets—Sheet 2.
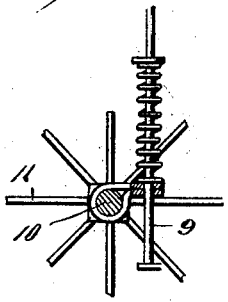
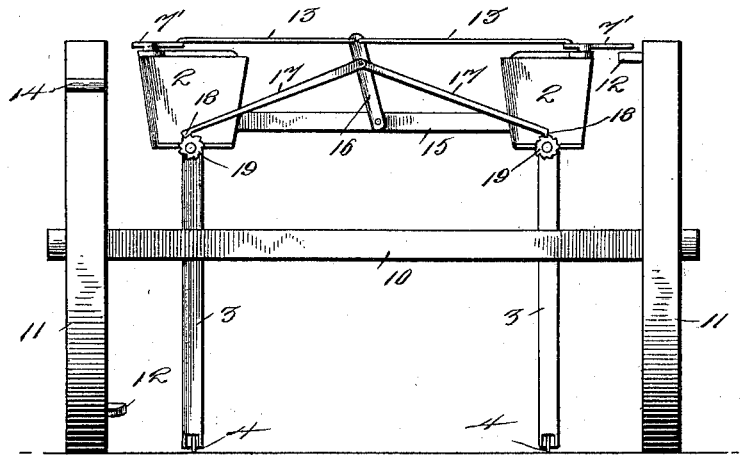
Witnesses
Inventors
J. Wm. Allen,
Crowell West,
by John Wedderburn
Attorney

UNITED STATES PATENT OFFICE.

JOHN WM. ALLEN AND CROMWELL WEST, OF NEW WINDSOR, ILLINOIS.

CHECK-ROW PLANTER.

SPECIFICATION forming part of Letters Patent No. 610,786, dated September 13, 1898.

Application filed July 23, 1897. Serial No. 645,692. (No model.)

*To all whom it may concern:*

Be it known that we, JOHN WM. ALLEN and CROMWELL WEST, of New Windsor, in the county of Mercer and State of Illinois, have invented certain new and useful Improvements in Check-Rowers; and we do hereby declare the following to be a full, clear, and exact description of the invention, such as will enable others skilled in the art to which it appertains to make and use the same.

Our invention relates to new and useful improvements in check-rowers.

The primary object of the invention is to provide a check-rower that will be especially simple in construction and will possess the requisites of strength and durability and will also be economical and efficient in operation.

A further object of the invention is to provide a check-rower the wheels or check-row markers of which will have a yielding motion with relation to the surface of the ground.

Further, our invention contemplates the provision of a check-rower that will be adapted to drop the corn from the seed-chambers alternately, so that the grains of corn in one row will be opposite the space between the grains in the next row, or to drop the seed from both chambers simultaneously when desired.

With these and other objects in view, which will become apparent in the course of the following description, our invention consists in the novel combination and arrangement of the simple parts that will be hereinafter fully described, and the points of novelty will be particularly pointed out in the claims.

We are enabled to accomplish the objects of our invention by the simple means illustrated in the accompanying drawings, in which—

Figure 1:
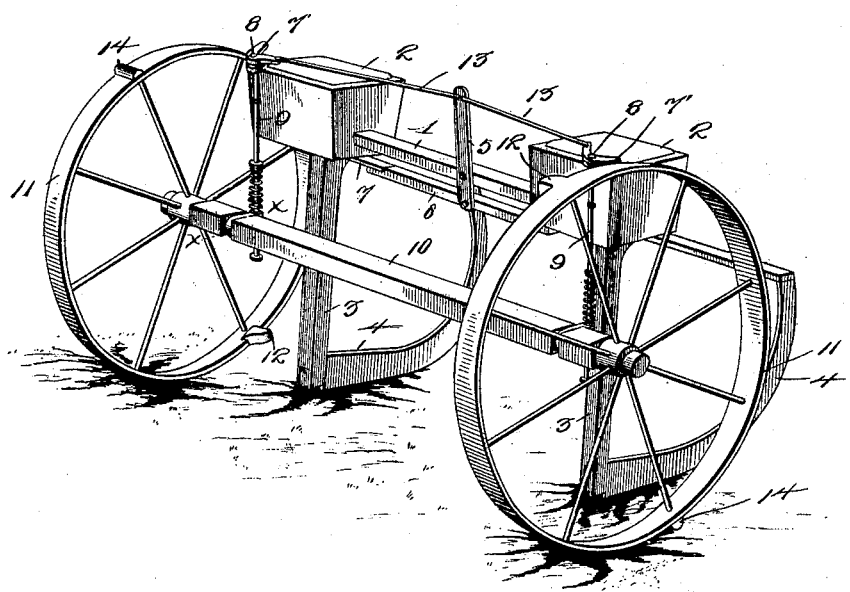
Figure 2:
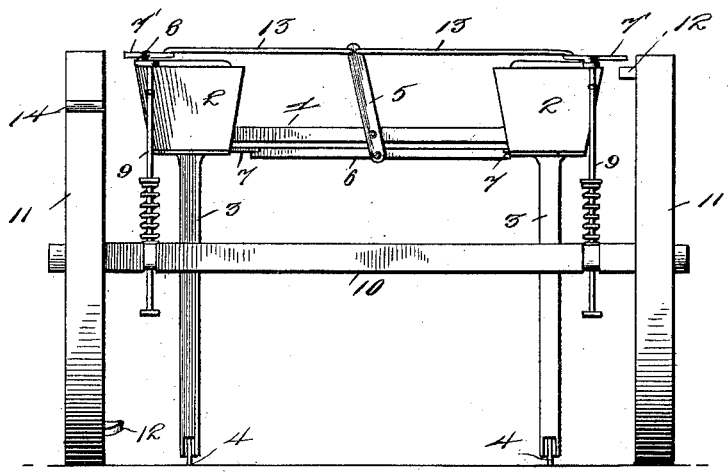

Figure 1 is a perspective view of our improved check-rower attached to a planter. Fig. 2 is a rear elevation of the planter, the check-rower being attached thereto. Fig. 3 is a sectional view taken on the line $x\ x$ of Fig. 1, showing the manner of attaching the wheels to the frame; and Fig. 4 is a rear elevation of an ordinary planter, showing the modified forms of means for actuating the drop-shafts.

For convenience we will proceed to first describe the form shown in Figs. 1, 2, and 3 of the drawings.

The numeral 1 indicates a cross-bar, which is provided at either end with the seed-chambers 2, to the under side of which are firmly secured the delivery-tubes 3, having their lower ends connected with runners 4, as is common with machines of this character. Pivoted to the central portion of the bar 1 is a lever 5, which has its lower end pivotally connected to the transverse bar 6, provided at its end with dropper-slides 7, adapted to extend into the seed-chambers or under the bottoms thereof. Said lever has its upper end connected with two angle-arms 7', which are pivotally secured to the upper sides of the seed-chambers, as indicated by the numeral 8.

The numeral 9 indicates two vertical rods secured to the seed-chambers, and the numeral 10 indicates the machine-axle, extending transversely across the machine and provided at its ends with wheels 11, which have secured thereto lugs or projections 12, adapted to engage the angle-levers 7' during the forward movement of the planter to rock the lever 5 in one direction or the other and through the medium of the rods or wires 13 to shift the transverse bar 6 in one direction or the other to close the opening in the floor of one seed-chamber and open the opening in the other, so that the corn can be planted in the order hereinbefore suggested, and it will be apparent that the openings in the gates can be so arranged with relation to the openings in the seed-chambers that the corn or seed will be dropped from both chambers simultaneously. The axle is mounted in bearing-sleeves adjacent to the carrying-wheels, said sleeves being provided with perforated lugs or ears, through which the rods 9 pass, said rods being secured in suitable bearings on the machine-frame or hopper, as shown, the upper ends of the rods extending slightly beyond the hoppers and serving as pivots, upon which the bell-crank levers 7' are mounted. Between the ears on the bearing-sleeves for the axle and suitable projections on the rods 9 said rods are surrounded by spiral springs, the tension of which is exerted to uphold the frame in uniform relation to the axle; but the rods being adapted to slide in the ears on the axle-sleeves the springs permit the relative vertical movement of the frame and axle to accommodate themselves to the uneven surface of the ground over which the wheels pass without undue jarring. The wheels are provided at proper intervals with castings or projections 14, which are brought in contact with the ground during the progress of the planter to mark the points where the seed has been deposited.

Referring now more particularly to Fig. 4 of the drawings, the numeral 15 indicates a transverse bar connected at its ends to any suitable portion of the frame, but preferably to arms secured to the rear portion of the seed-chamber. Pivoted centrally to said arm in the present instance is a lever 16, the equivalent of the lever 5, hereinbefore described. Pivotally secured to said lever, at the inner central portion thereof, are two arms 17, provided upon their ends with notches 18, adapted to engage the teeth of ratchet-wheels 19, keyed to the rotary drop-shaft of the machine, which extends across the machine beneath the seed-chambers, and it will be noted that as the lever is rocked the ratchet-wheels will be engaged by the lever 17, causing said wheels to be rotated step by step as the angle-levers are engaged by the projections upon the wheels.

It is obvious that the invention herein described is susceptible of many minor changes and modifications involving mechanical skill, and we do not therefore desire to limit ourselves to the precise construction of the parts shown—as, for instance, as before stated, the gates beneath the seed-chambers can be arranged to drop the corn simultaneously from both seed-chambers or alternately from said chambers.

We are aware that corn and other seed have been planted in the orders suggested; but the means for accomplishing these objects have heretofore been somewhat complicated.

It will be noted that the device herein described is especially simple in construction and that the objects stated and those looking toward simplifying and improving devices of this character have been effectually accomplished.

Having thus described our invention, what we claim, and desire to secure by Letters Patent, is—

1. In a check-row planter, the combination with the machine-frame of a pair of rigidly-connected seedboxes provided respectively with pendent delivery-tubes having forwardly-extending runners connected to their lower ends, interdependent seed-dropping mechanisms carried by each of said boxes, an axle-bar mounted to yield in bearings on the frame, and wheels on said axle provided with means for actuating the seed-dropping mechanisms, substantially as specified.

2. The combination with the machine-frame, of the yielding axle on which the carrying-wheels are secured provided with sleeve-bearings having perforated ears engaging vertical rods or arms on the machine-frame and adapted to yield or slide thereon, said rods extending above the seed-hoppers, bell-crank levers connected to the upper ends of said rods, an intermediate vertical lever pivoted to the machine-frame and connected to the seed-dropping devices, connections between said intermediate lever and the bell-crank levers, and projections on the wheels for alternately actuating the said bell-crank levers in opposite directions for actuating the seeding devices, substantially as described.

3. The combination in a check-row planter with the frame thereof, of the rigidly-connected seed-hoppers, the axle upon which the carrying-wheels are secured, the interposed vertical rods connecting the frame and axle, springs on said rods permitting the relative movement of the frame and axle, bell-crank levers on the upper ends of said rods, an intermediate, vertically-arranged lever pivoted to the machine-frame and connected with the seed-actuating devices, connections between said bell-cranks and said intermediate lever, and projections or cams on the carrying-wheels, arranged to actuate said bell-crank levers for operating the seed mechanism, substantially as described.

In testimony whereof we have signed this specification in the presence of two subscribing witnesses.

J. WM. ALLEN.
CROMWELL WEST.

Witnesses:
H. J. HARBOUR,
CHAS. A. SWANSON.